(12) United States Patent  
Dewey et al.

(10) Patent No.: US 7,972,749 B2
(45) Date of Patent: Jul. 5, 2011

(54) LOW VOLTAGE POWER TAP ON HIGH VOLTAGE STACK

(75) Inventors: Scott Dewey, Dansville, NY (US); Clark G. Hochgraf, Rochester, NY (US); Victor W. Logan, Naples, NY (US); John Wheat, Rochester, NY (US); David B Ouwerkerk, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 2386 days.

(21) Appl. No.: 10/875,464

(22) Filed: Jun. 24, 2004

(65) Prior Publication Data

US 2005/0287411 A1 Dec. 29, 2005

(51) Int. Cl.
*H01M 4/64* (2006.01)
*H01M 8/24* (2006.01)

(52) U.S. Cl. ............... 429/518; 429/452; 429/517
(58) Field of Classification Search ............... None
See application file for complete search history.

(56) References Cited

U.S. PATENT DOCUMENTS

| | | | | |
|---|---|---|---|---|
| 3,134,696 A * | 5/1964 | Douglas et al. | | 429/454 |
| 4,310,605 A * | 1/1982 | Early et al. | | 429/18 |
| 5,642,275 A * | 6/1997 | Peng et al. | | 363/137 |
| 6,496,393 B1 * | 12/2002 | Patwardhan | | 363/70 |
| 6,677,066 B1 * | 1/2004 | Jansen et al. | | 429/7 |
| 2003/0091884 A1 * | 5/2003 | Scartozzi | | 429/32 |
| 2005/0042492 A1 * | 2/2005 | Kato et al. | | 429/34 |
| 2005/0048335 A1 * | 3/2005 | Fields et al. | | 429/22 |
| 2006/0055246 A1 | 3/2006 | Jansen et al. | | |

FOREIGN PATENT DOCUMENTS

WO  WO 99/67869  * 12/1999

* cited by examiner

*Primary Examiner* — Dah-Wei D Yuan
*Assistant Examiner* — Kwang Han
(74) *Attorney, Agent, or Firm* — John A. Miller; Miller IP Group, PLC

(57) ABSTRACT

A fuel cell system that includes a fuel cell stack providing high voltage power. A tap is electrically coupled to the positive end of the stack to provide a positive voltage output terminal of the fuel cell stack, and a tap is electrically coupled to the negative end of the stack to provide a negative output terminal of the fuel cell stack. A low voltage tap is electrically coupled to one or more intermediate bipolar plates of the stack to provide low voltage power. Several intermediate taps can be electrically coupled to the bipolar plates, where a center intermediate tap is designated a reference potential tap. A switching network switches the several voltage potentials to provide an AC signal.

13 Claims, 2 Drawing Sheets

LOW VOLTAGE POWER TAP ON HIGH VOLTAGE STACK

BACKGROUND OF THE INVENTION

1. Field of the Invention

This invention relates generally to a fuel cell stack employing a low voltage tap and, more particularly, to a fuel cell stack having one or more low voltage power taps for providing low voltage DC power for low voltage devices in a fuel cell system or AC power to other devices in the system.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. For example, a typical fuel cell stack for an automobile may have two hundred stacked fuel cells. The fuel cell stack receives a cathode input gas as a flow of air, typically forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several membranes in the stack. For the automotive fuel cell stack mentioned above, the stack would include about two hundred bipolar plates. The bipolar plates include an anode side and a cathode side for adjacent fuel cells in the stack. The bipolar plates are made of a conductive material, such as stainless steel, so that they conduct the electricity generated by the fuel cells out of the stack. The bipolar plates also include flow channels through which a cooling fluid and the anode and cathode gases for the electrochemical reaction flow, as is well understood in the art.

Vehicles and other systems typically require 12 volt DC nominal power to provide power to various vehicle accessories, such as headlights, switches, etc. In the known systems, the 12 volt DC power is provided by a DC/DC converter that down-converts the high voltage from the fuel cell stack. Particularly, the high voltage of the overall DC power from the fuel cell stack is down-converted by the DC/DC converter to the desired voltage level for the various low voltage devices. However, the DC/DC converter adds cost, mass, volume, losses and additional assembly costs to the fuel cell system. Further, in high voltage fuel cell systems where the fuel cell stack is floating with respect to the vehicle chassis ground, the DC/DC converter must include electrical isolation to prevent the chassis from coming in contact with the high voltage. This converter isolation also increases the cost, mass and losses associated with the system. It would be desirable to eliminate the DC/DC converter from the fuel cell system for these reasons.

SUMMARY OF THE INVENTION

In accordance with the teachings of the present invention, a fuel cell system is disclosed that includes a fuel cell stack providing high voltage DC output power, such as for operating a vehicle. The fuel cell stack includes a stack of fuel cells each being separated by a bipolar plate. A tap is electrically coupled to the end plate at the positive end of the stack to provide a positive voltage output terminal of the fuel cell stack, and a tap is electrically coupled to the end plate at the negative or ground end of the stack to provide a negative output terminal of the fuel cell stack. The total output voltage of the stack is provided across the positive and negative terminal taps. The fuel cell stack further includes one or more intermediate low voltage taps electrically coupled to one or more of the bipolar plates so that a low voltage potential is provided across the negative terminal tap and the intermediate taps to provide low voltage DC power for operating ancillary vehicle components.

According to one embodiment of the invention, several intermediate taps are electrically coupled to various bipolar plates so that several DC voltage potentials are provided. A center intermediate tap is designated a reference potential tap, and the intermediate taps having a higher voltage potential than the reference potential are positive taps and the intermediate taps having a lower voltage potential than the reference voltage are negative taps. By providing a suitable switching network, the several voltage potentials can be switched to provide an AC signal to drive AC components, such as three phase motors.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to tapping low voltage from a fuel cell stack is merely exemplary in nature, and is in no way intended to limit the invention or its applications or uses.

Figure 1:
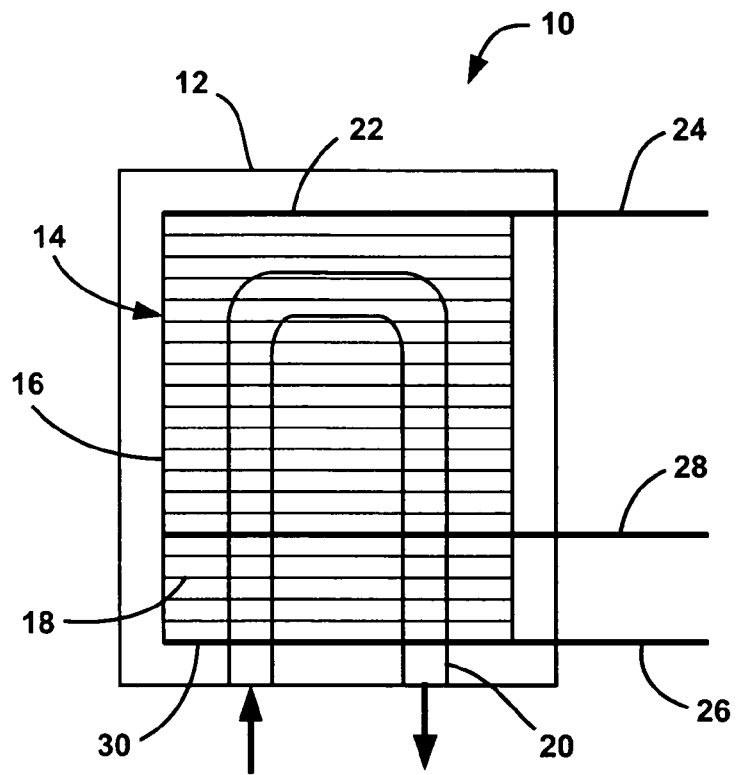
FIG. 1 is a plan view of a fuel cell stack including an intermediate voltage potential tap, according to an embodiment of the present invention.

FIG. 1 is a plan view of a fuel cell system 10 including an outer housing 12. A fuel cell stack 14 is positioned within the housing 12, and includes a plurality of stacked fuel cells 16 separated by bipolar plates 18. As is understood in the art, the bipolar plates 18 include various flow channels for cooling fluids, anode gases and cathode gases to provide the necessary fuel and cooling to the fuel cells 16. A coolant loop 20 flows through the fuel cells 16 to provide the coolant to the stack 14. Each bipolar plate 18 includes an anode side and a cathode side for the anode and cathode of adjacent fuel cells.

A positive terminal tap 24 is electrically coupled to an end plate 22 at the positive end of the fuel cell stack 14 and a negative terminal tap 26 is electrically coupled to an end plate 30 at the negative or ground end of the fuel cell stack 14. As is well understood in the art, operation of the fuel cell stack 14 causes the fuel cells 16 to generate electrical DC power in series so that a high voltage output potential is provided across the taps 24 and 26 to provide power to drive the vehicle. The number of fuel cells 16 in the stack 14 determines the total output power.

As discussed above, a DC/DC converter is typically used in the art to down-convert the electric potential across the taps 24 and 26 to the desired level for low voltage devices on the vehicle. According to the invention, the DC/DC power converter can be eliminated from the fuel cell system by providing an intermediate terminal tap 28 electrically coupled to a specific bipolar plate 18 between the end plates 22 and 30 of the stack 14. The output power of each fuel cell 16 is known. Therefore, by carefully choosing which bipolar plate 18 the tap 28 is coupled to, the voltage potential between the taps 26 and 28 can be accurately determined. For those vehicle accessories that operate on 12 volt nominal DC power, the appropriate bipolar plate 18 is selected for the intermediate tap 28, and all of the 12 volt DC devices get their power from the stack of fuel cells 16 between the taps 26 and 28. Alternately, the intermediate tap 28 can be electrically coupled to a different bipolar plate 18 to provide a different DC voltage level, such as to drive a 42 volt motor, etc. Further, multiple intermediate taps can be provided at several locations in the stack 14 to provide as many DC output potentials as desired.

The tap 28 can be electrically coupled to the desired bipolar plate 18 by any suitable technique. For example, the bipolar plates 18 typically have a metal tab that can be drilled, and electrical wires can be coupled to the holes in the tab. Further, a metal plate with a tap can be provided between fuel cells for the desired voltage. This plate can be used to provide uniform current distribution.

Figure 2:
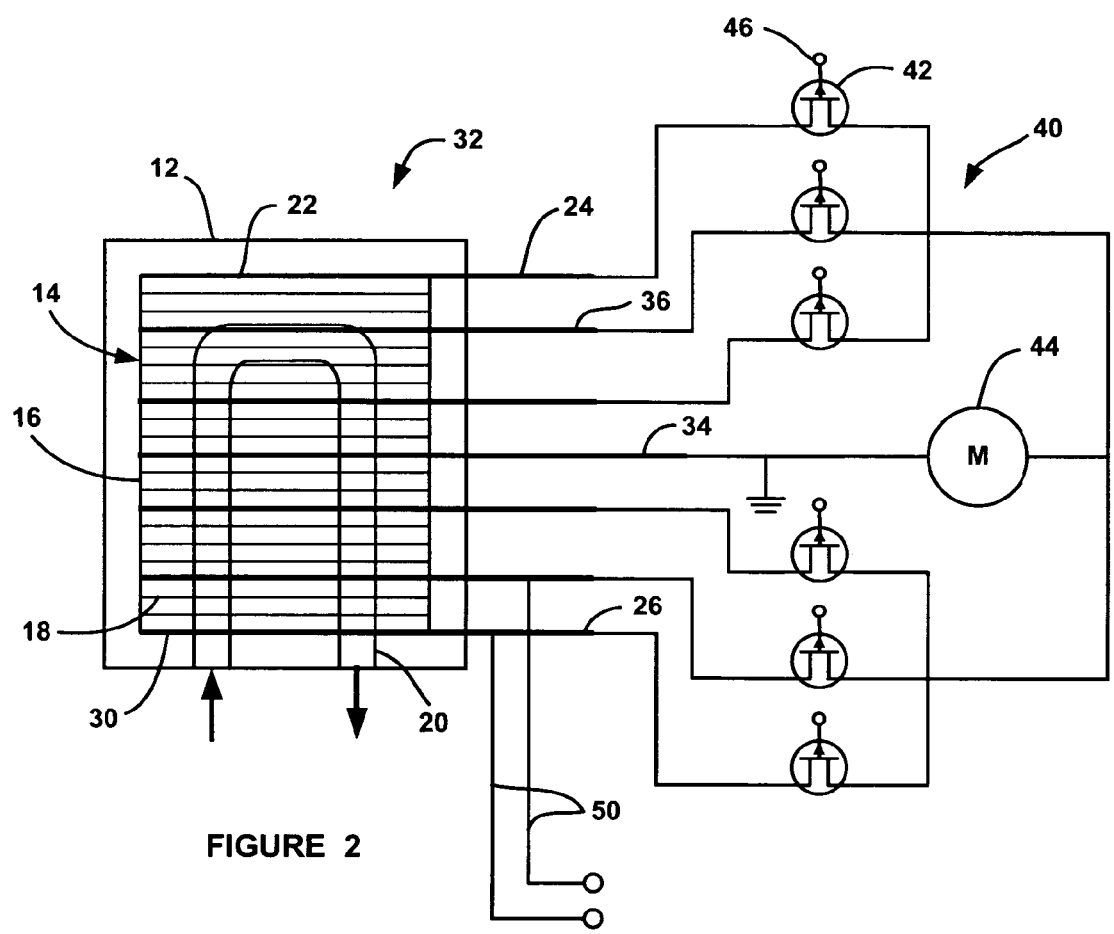
FIG. 2 is a plan view of a fuel cell stack including a plurality of intermediate voltage potential taps and a switching network to provide an AC voltage potential, where one of the taps is designated a reference potential tap, according to another embodiment of the present invention.

FIG. 2 is a plan view of a fuel cell system 32 that is similar to the fuel cell system 10, where like components are identified by the same reference numeral. In the fuel cell system 32 several intermediate taps 36 are electrically coupled to several of the bipolar plates 18 at specific and desired locations. A center intermediate tap 34 is designated a reference potential tap, and provides a reference potential relative to the other taps 36 in the system 32. Therefore, all of the intermediate taps 36 that have a voltage potential lower than the reference voltage potential are negative potential taps and all of the intermediate taps 36 that have a higher voltage potential than the reference voltage are positive potential taps.

Figure 3:
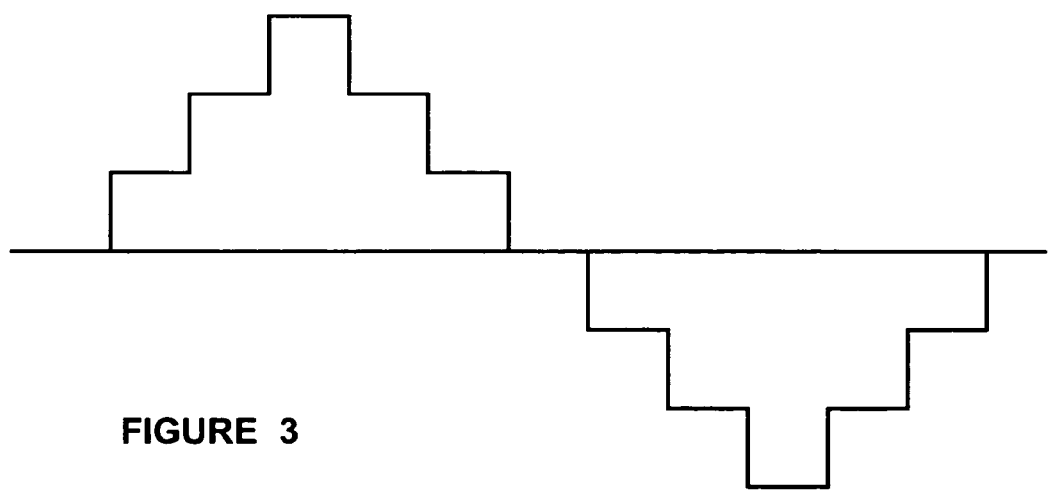
FIG. 3 is an AC signal generated by the switching network shown in FIG. 2.

The system 32 includes a switching network 40 including a series of FET switches 42. FET switches are used by way of a non-limiting example in that any suitable switch can be used. A separate FET switch 42 is electrically coupled to each of the taps 36, as shown. By selectively switching the potentials from the taps 36 at the appropriate time, a stepped AC signal can be generated, as shown in FIG. 3, relative to the reference potential tap 34. A controller (not shown) provides a signal to the gate terminal 46 of each FET switch 42 to turn it on at the appropriate time so that the time-sequenced signal provides the AC signal. The AC signal can be used to drive certain AC components on the vehicle, such as a three-phase motor 44. The low voltage signal for the 12V components can still be taken from the negative tap 26 and one of the intermediate taps 36 on lines 50.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack, said fuel cell stack including a plurality of electrically coupled fuel cells separated by electrical plates, said electrical plates being bipolar plates where each bipolar plate includes an anode side and a cathode side for the anode and cathode of adjacent fuel cells, said fuel cell stack further including a negative tap electrically coupled at a negative end of the stack and a positive tap electrically coupled at a positive end of the stack, wherein a stack potential is provided across the positive tap and the negative tap from all the fuel cells in the stack;
a plurality of intermediate taps each being electrically coupled to a different intermediate plate of the electrical plates in the fuel cell stack and providing different voltage potentials that are less than the stack potential, wherein one of the intermediate taps is designated a reference potential tap, and wherein the intermediate taps between the reference potential tap and the positive tap are positive intermediate taps and the intermediate taps between the reference tap and the negative tap are negative intermediate taps; and
a switching network, said switching network selectively switching the intermediate taps to generate an AC signal.

2. The system according to claim 1 wherein the switching network includes a plurality of FET switches, each FET switch being electrically coupled to a different plate.

3. The system according to claim 1 wherein the AC signal drives a three-phase motor.

4. The system according to claim 1 wherein the DC potential between the negative tap and the intermediate tap provides a 12 volt potential.

5. The system according to claim 1 wherein the system is a fuel cell system on a vehicle.

6. The system according to claim 5 wherein the DC potential between the negative tap and the intermediate tap drives low voltage components on the vehicle.

7. A fuel cell system comprising:
a fuel cell stack, said fuel cell stack including a plurality of electrically coupled fuel cells separated by bipolar plates, said fuel cell stack further including a negative tap electrically coupled at a negative end of the stack and a positive tap electrically coupled at a positive end of the stack, wherein a stack potential is provided across the positive tap and the negative tap from the fuel cells in the stack;
a plurality of intermediate taps electrically coupled to different intermediate bipolar plates, where the intermediate taps are part of the bipolar plate, in the fuel cell stack between the negative tap and the positive tap, wherein a DC potential between the negative tap and any one of the intermediate taps provides a voltage potential that is less than the stack potential, and wherein one of the intermediate taps is designated a reference potential tap and the intermediate taps between the reference potential tap and the positive tap are positive intermediate taps and the intermediate taps between the reference potential tap and the negative tap are negative intermediate taps; and a switching network, said switching network selectively switching the intermediate taps to generate an AC signal.

8. The system according to claim 7 wherein the switching network includes a plurality of FET switches, each FET switch being electrically coupled to a different bipolar plate.

9. The system according to claim 7 wherein the AC signal drives a three-phase motor.

10. The system according to claim 7 wherein the system is a fuel cell system on a vehicle.

11. The system according to claim 7 wherein a DC potential between the negative tap and a particular intermediate tap drives low voltage components on the vehicle.

12. A method for providing a low voltage potential from a fuel cell stack that generates a high voltage potential, said fuel cell stack including a plurality of electrically coupled fuel cells separated by electrical plates, said electrical plates being bipolar plates where each bipolar includes an anode side and a cathode side for the anode and cathode of adjacent fuel cells, said method comprising:

electrically coupling a positive tap to a positive end of the fuel cell stack;

electrically coupling a negative tap to a negative end of the fuel cell stack;

providing the high voltage potential between the positive tap and the negative tap of the stack;

electrically coupling a plurality of intermediate taps to different intermediate plates of the electrical plates in the fuel cell stack that provide different low voltage potentials;

providing the low voltage potential between the negative tap and the intermediate tap;

designating one of the intermediate taps a reference potential tap, wherein the intermediate taps between the reference potential tap and the positive tap are positive intermediate taps and the intermediate taps between the reference tap and the negative tap are negative intermediate taps; and electrically coupling a switching network to the plurality of intermediate taps for selectively switching the intermediate taps to generate an AC signal.

13. The method according to claim 12 wherein the high voltage potential drives high voltage vehicle components and the low voltage potential drives low voltage vehicle components.

* * * * *